United States Patent [19]

Marchetti

[11] 3,869,455

[45] Mar. 4, 1975

[54] PYRROLIDIDES AND MORPHOLIDES OF 4,5-DIPHENYL-OXAZOLE-2-ALKANOIC ACIDS

[75] Inventor: Enzo Marchetti, Rome, Italy

[73] Assignee: Instituto Farmacologico Serono S.p.A., Rome, Italy

[22] Filed: Mar. 1, 1971

[21] Appl. No.: 119,832

[30] Foreign Application Priority Data

Mar. 5, 1970 Italy................................ 21550/70

[52] U.S. Cl........ 260/247.5 E, 260/307 R, 424/248
[51] Int. Cl............................................ C07d 87/40
[58] Field of Search .................. 260/307 R, 247.5 E

[56] References Cited
UNITED STATES PATENTS

| 2,166,118 | 7/1939 | Bousquet et al. | 260/247.7 H |
|---|---|---|---|
| 3,470,195 | 9/1969 | O'Mant | 260/307 R |
| 3,578,671 | 5/1971 | Brown | 260/307 R |
| 3,622,595 | 11/1971 | Marchetti | 260/307 R |

OTHER PUBLICATIONS

Tanaka et al., Chemical Abstracts, Vol. 58, p. 3408c (1963).

Instituto Farmacologico Serono S.p.A., Chemical Abstracts, Vol. 72, 66930W, (1970).

Primary Examiner—Donald G. Daus
Assistant Examiner—Jose Tovar
Attorney, Agent, or Firm—Dennis P. Clarke

[57] ABSTRACT

New carboxylic acid amide and hydrazide derivatives of 4,5-diphenyloxazole of the general formula:

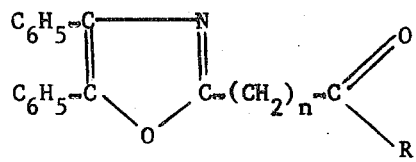

as provided, which have analgesic or antiphlogistic activities. A process for preparing said compounds is also provided.

7 Claims, No Drawings

PYRROLIDIDES AND MORPHOLIDES OF 4,5-DIPHENYL-OXAZOLE-2-ALKANOIC ACIDS

This invention relates to a series of Carboxylic acid amide and hydrazide derivatives of 4,5-diphenyloxazole of the general formula:

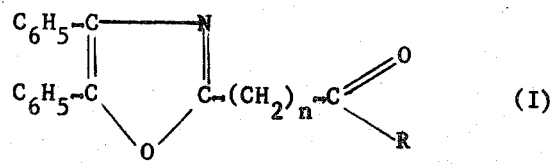

(I)

and relates alto to a process for preparing them.

In the above formula, $n$ is 0, 1 or 2 and R represents a monoalkylamino radical having 1 to 4 carbon atoms; a dialkylamino radical having 1 to 4 carbon atoms in each of the alkyl groups; a N-heterocyclic radical having 5 or 6 ring members which can also comprise another hetero atom; or a hydrazino or N',N'-dialkylhydrazino radical having 1 to 4 carbon atoms in each of the alkyl groups.

Specific examples of the radicals represented by R include: $NHCH_3$, $N(C_2H_5)_2$,

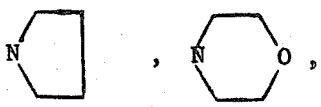

$NH—NH_2$, $NH—N(CH_3)_2$.

The compounds of the general formula (I) are characterized by a marked analgesic activity often together with an antiphlogistic activity and a depressing action on the central nervous system.

4,5-diphenyl-substituted oxazole derivatives bearing a secondary or tertiary amino group (Applicant's Italian Patent Application No. 18390/66 (37/499) filed Aug. 10, 1966) or a carboxyl group in the 2-position of the ring, which is one or more methylene groups away from the heterocyclic ring, are known to have antiphlogistic, analgesic and antiulcerogenic properties (*Nature* 219, 164, 1968).

In addition, the N-amidino-carbonamides of the same acids are also known to enhance the diuretic and natruretic activities of benzothiazidine type diuretics (Applicant's Italian Patent Application No. 12243 A/68 filed January 31, 1968).

In accordance with this invention, the compounds of the general formula (I) are prepared through aminolysis or hydrazinolysis of an ester of the general formula (V)

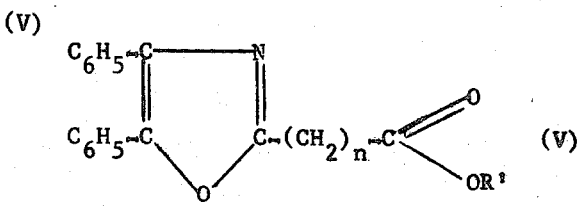

wherein $n$ is 0, 1 or 2 and R' represents an alkyl radical having 1 to 4 carbon atoms, by using an amine or hydrazine of the general formula (VI):

$$H—R$$

(VI)

wherein R is as defined above. The above ester (V) can be prepared in turn by acylating α-phenyl-α-aminoacetophenone (II) with a dicarboxylic acid monoester-monochloride of the general formula (III) and thereafter cyclizing the resulting acylamino-derivative (IV) with phosphorus oxychloride or similar condensing agents in accordance with the following scheme:

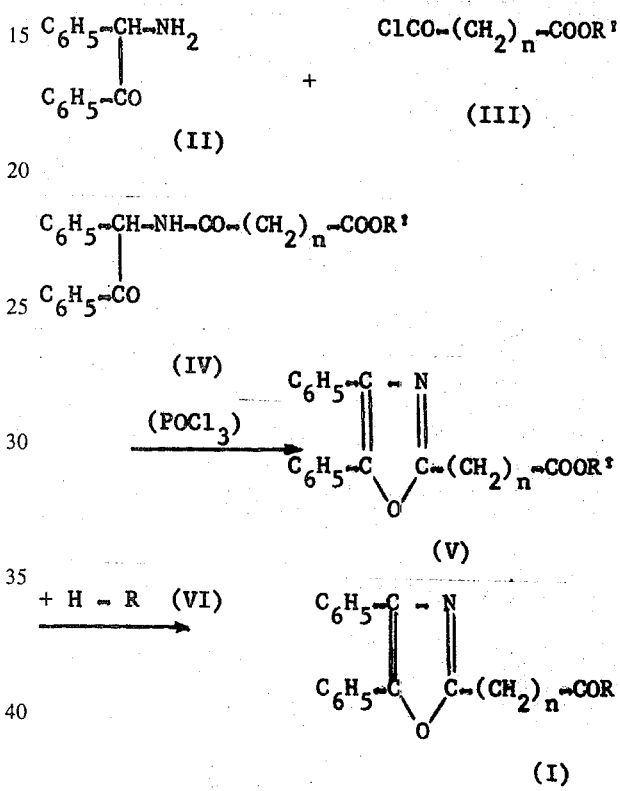

In the above scheme $n$, R and R' are as defined above.

The acylation of α-amino-α-phenyl-acetophenone (II) with the monoester-monochloride (III) is suitably carried out on the hydrochloride of (II) in an inert solvent such as benzene or toluene at the boiling point of the mixture, the molar ratio of the reagents being preferably of about 1:1.

The acylamino compound (IV) is then cyclized to the oxazole derivative (V) with $POCl_3$, $PCl_3$ or the like in inert solvents such as benzene or toluene, at temperatures ranging from room temperature to the boiling point of the mixture. The reaction of the ester (V) with the appropriate base (VI) is carried out in the presence or in the absence of a suitable organic solvent (benzene, toluene, xylene and so on) depending on the specific reactivities of the reagents, at temperatures of from 20° to 120°C and for reaction times ranging from 1 to 36 hours.

A modification of the above procedure, which modification can be applied only to the compounds of the formula (I) wherein $n$ is 1 or 2, comprises hydrolizing with an alkali a corresponding ester (V) wherein $n$ is 1 or 2 to give a corresponding caroxylic acid which is then converted to the acid chloride by using thionyl chloride at room temperature in the presence or in the absence of a suitable solvent such as dry benzene, toluene or xylene; and reacting the resulting acid chloride with an appropriate amine or hydrazine taken in a large molar excess amount, in inert solvents, to give the desired amide or hydrazide.

The above modification does not offer, however, any advantage over the previously outlined procedure.

The following illustrative and non limitative Examples will illustrate more detailedly the new compounds of this invention and the methods for preparing them.

EXAMPLE 1

4,5-Diphenyl-2-oxazolyl-carboxylic acid N,N-diethylamide

A solution of 8.8 g. 2-carbethoxy-4,5-diphenyloxazole (prepared according to Chemical Abstracts 58, 3408) in 31 ml. diethylamine was refluxed for 24 hours. The excess diethylamine was removed at 20 mm. pressure, the residue was dissolved in 100 ml. of boiling 70% ethanol and, upon cooling the solution, 7 g. of 4,5-diphenyl-2-oxazolyl-caroxylic acid N,N-diehtylamide crystallized, m.p. 130°–132°C (yield 73%).

EXAMPLE 2

4,5-Diphenyl-2-oxazolyl-carboxylic acid N',N'-dimethylhydrazide

A mixture of 11.6 g. 2-carbethoxy-4,5-diphenyloxazole (prepared as indicated in Example 1) and 18 g. N,N-dimethylhydrazine was refluxed for 4 hours on a boiling water bath. The excess N,N-dimethylhydrazine was removed at 20 mm. pressure, the residue was dissolved in 150 ml. of boiling 95% ethanol and, upon cooling to 0°C 9 g. of 4,5-diphenyl-2-oxazolyl-carboxylic acid N',N'-dimethylhydrazide crystallized, m.p. 190°–192°C (yield 73%).

EXAMPLE 3 a.

α-Phenyl-α-(N-carbethoxyacetylamino)-acetophenone

A mixture of 6.2 g. α-phenyl-α-amino-acetophenone hydrochloride and 5.2 g. carbethoxy-acetylchloride in 40 ml. anhydrous benzene was refluxed for 4 hours. The boiling mixture was filtered, the filtrate was cooled to 15°C and diluted with 20 ml. ligroin (boiling range 30 to 60°C). Upon cooling to 0°C, 6.5 g. α-phenyl-α-(N-carbethoxyacetylamino)-acetophenone crystallized, m.p. 90°–92°C (yield 80%).

b. Ethyl 4,5-diphenyl-2-oxazolylacetate

A solution of 6.5 g. α-phenyl-α-(N-carbethoxyacetylamino)-acetophenone and 8 g. phosphorus oxycloride in 15 ml. anhydrous benzene was refluxed for 1 hours. The solvent was removed at 20 mm. pressure and the oily residue was taken up with 60 ml. 50% ethanol, whereby 4.9 g. crystalline ethyl 4,5-diphenyl-2-oxazolylacetate gradually separated, m.p. 65°–67°C (yield 79%).

c. 4,5-Diphenyl-2-oxazolylacetic acid N-methylamide

A mixture of 9 g. ethyl 4,5-diphenyl-a-oxazolylacetate and 100 ml. of a 20% benzene solution of methylamine was kept in a stoppered flask for 36 hours at 22°C. Upon diluting the benzene solution with 100 ml. ligroin, 7.2 g. 4,5-diphenyl-2-oxazolylacetic acid N-methylamide crystallized, m.p. 139°–142°C (yield 81%).

EXAMPLE 4

4,5-Diphenyl-2-oxazolylacetic acid morpholide 6 g. ethyl 4,5-diphenyl-2-oxazolylacetete (prefared as described in Example 3 a–b) and 17 g-morpholine were refluxed for 6 hrs. The excess morpholine was removed at 20 mm. pressure and the oily residue was taken up with 100 ml. 50 % ethanol, whereby the crystalline 4,5-diphenyl-2-oxazolylacetic acid morpholide gradually separated. The recrystallization of this compound from a mixture of absolute ethanolanhydrous ether-ligroin gave 4.2 g. of a product melting at 127°–129°C (yield 60 %).

EXAMPLE 5

4,5-Diphenyl-2-oxazolylacetic acid hydrazide

A solution of 6 g. ethyl 4,5-diphenyl-2-oxazolylacetate (prepared as described in Example 3 a–b) in 50 ml. absolute ethanol was treatet with 10 ml. 98 % hydrazine hydrate. The reaction mixture was maintained at 22°C for 1 hr., after which 50 ml. distilled water were added to completely precipitate the 4,5-diphenyl-2-oxazolylacetic acid hydrazide which was then purified by crystallization from 70 % ethanol to give 4,7 g. of a product melting at 164°–165°C (yield 79 %).

EXAMPLE 6 a.

α-Phenyl-α-[N-(β-carbomethoxypropionyl)-amino]acetophenone

A mixture of 7.4 g. α-phenyl-α-aminoacetophenone hydrochloride and 6 g. β-carbomethoxypropionyl chloride in 60 ml. anhydrous benzene was refluxed for 5 Hrs. After filtering the boiling mixture and cooling the filtrate to 15°C, 20 ml. ligroin (boiling 30° to 60°C) were added. Upon cooling to 0°C, 8.5 g. α-phenyl-α-[N-(β-carbomethoxypropiony)-amino]-acetophenone crystallized, m.p. 103°–104°C (yield 87 %).

b. Methyl 3-(4,5-diphenyl-2-oxazolyl)-propionate

A solution of 6.5 g. α-phenyl-α-[N-(β-carbomethoxypropionyl)-amino]-acetophenone and 8 g. phosphorus oxychloride in 20 ml. anhydrous benzene was refluxed for 1 hr. The solvent was removed at 20 mm. pressure and the oily residue was taken up with 60 ml. 50 % ethanol. From the resulting solution at room temperature 5.2 g. methyl 3-(4,5-diphenyl-2-oxazolyl)-propionate crystallized, m.p. 58°–59°C (yield 85%).

c. 3-(4,5-diphenyl-2-oxazolyl)-propionic acid pyrrolidide 9.2 g. methyl 3-(4,5-diphenyl-2-oxazolyl)-propionate and 25 ml. pyrrolidine were refluxed for 3 hours. The excess pyrrolidine was removed at 20 mm. pressure and the oily residue was taken up with 100 ml. 70% ethanol. Upon cooling to 0°C, 8.5 g. 3-(4,5-diphenyl-2-oxazolyl)-propionic acid pyrrolidide crystallized from the resulting solution; m.p. 62°–66°C (yield 82%).

EXAMPLE 7 a. 3-(4,5-diphenyl-2-oxazolyl)-propionic acid 6.1 g. methyl 3-(4,5-diphenyl-2-oxazolyl)-propionate (prepared as described in Example 6 a–b) were dissolved in a solution of 4 g. sodium hydroxide in 40 ml. water and 30 ml. ethanol. The solution was refluxed for 1 hour, cooled to 5°C and acidified with 10% hydrochloric acid to pH 2 to precipitate the 3-(4,5-diphenyl-2-oxazolyl)-propionic acid. The reaction product was purified by crystallization from 70% ethanol to give 5.3 g. of a product melting at 160°-162°C (yield 90%).

b. 3-(4,5-diphenyl-2-oxazolyl)-propionic acid N,N-diethylamide 12 g. 3-(4,5-diphenyl-2-oxazolyl)-propionic acid were suspenden into 100 ml. anhydrous benzene and 8.6 ml. thionyl chloride were added. The reaction mixture was amintained at room temperature for 1 hour, after which the excess solvent and thionyl chloride were removed at 5 mm. pressure. The oily residue was dissolved in 50 ml. anhydrous benzene and the resulting solution was added dropwise, under stirring, to a solution of 6 g. diehtylamine in 100 ml. anhydrous benzene, which had been previously cooled to 0°C. After the completion of the addition the temperature was increased to 22°-25°C, the reaction mixture was washed with water and the separated benzene phase was distilled at 20 mm. pressure. The oily residue was dissolved in 50 ml. anhydrous ether and the resulting solution was treated with 50 ml. ligroin and cooled to 0°C, whereby 7.5 g. 3-(4,5-diphenyl-2-ozazolyl)-propionic acid N,N-diethylamide crystallized, m.p. 61°-63°C (yield 54 %).

In the following Table the compounds of the formula (I) prepared as described in the preceding Examples and other compounds which can be obtained with similar procedures are listed together with the respective melting points.

TABLE 1. 4,5-diphenyl-2-oxazolyl-carboxylic acid N-methylamide m.p. - 150°-152°C
2. 4,5-diphenyl-2-oxazolyl-carboxylic acid N,N-diethylamide m.p. - 130°-132°C
3. 4,5-diphenyl-2-oxazolyl-carboxylic acid pyrrolidide m.p. - 158°-159°C
4. 4,5-diphenyl-2-oxazolyl-carboxylic acid morpholide m.p. - 141°-142°C
5. 4,5-diphenyl-2-oxazolyl-carboxylic acid N',N'-dimethylhydrazide m.p. - 190°-192°C
6. 4,5-diphenyl-oxazolylacetic acid N-methilamide m.p. - 139°-142°C
7. 4,5-diphenyl-2-oxazolylacetic acid N,N-diethylamide m.p. - 59°-61°C
8. 4,5-diphenyl-2-oxazolylacetic acid pyrrolidide m.p. - 129°-131°C
9. 4,5-diphenyl-2-oxazolylacetic acid morpholide m.p. - 127°-129°C
10. 4,5-diphenyl-2-oxazolylacetic acid hydrazide m.p. - 164°-165°C
11. 3-(4,5-diphenyl-2-oxazolyl)-propionic acid N-methylamide m.p. - 128°-130°C
12. 3-(4,5-diphenyl-2-oxazolyl)-propionic acid N,N-diethylamide m.p. - 61°-63°C
13. 3-(4,5-diphenyl-2-oxazolyl)-propionic acid pyrrolidide m.p. - 62°-66°C
14. 3-(4,5-diphenyl-2-oxazolyl)-propionic acid morpholide m.p. - 101°-103°C
15. 3-(4,5-diphenyl-2-oxazolyl)-propionic acid hydrazide m.p. - 127°-129°C
16. 3-(4,5-diphenyl-2-oxazolyl)-propionic acid N',N'-dimethylhydrazide m.p. - 137°-139°C

I claim:

1. A carboxylic acid amide of the formula:

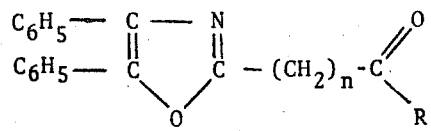

wherein $n$ is 0, 1 or 2 and R represents pyrrolidino or morpholino.

2. As a compound of claim 1, 4,5-diphenyl-2oxazolyl-carboxylic acid pyrrolidide.
3. As a compound of claim 1, 4,5-diphenyl-2-oxazolyl-carboxylic acid morpholide.
4. As a compound of claim 1, 4,5-diphenyl-2-oxazolylacetic acid Pyrrolidide.
5. As a compound of claim 1, 4,5-diphenyl-2-oxazolylacetic acid morpholide.
6. As a compound of claim 1, 3-(4,5-diphenyl-2-oxazolyl)-propionic acid pyrrolidide.
7. As a compound of claim 1, 3-(4,5-diphenyl-2-oxazolyl)-propionic acid morpholide.

* * * * *